Dec. 3, 1957 W. LOHS ET AL 2,815,402

IMPULSE STORAGE DEVICE FOR SIGNALING SYSTEMS

Filed Nov. 15, 1954 3 Sheets-Sheet 1

Inventors.
Willi Lohs, &
Walter Paul

By. [signature] Atty

IMPULSE STORAGE DEVICE FOR SIGNALING SYSTEMS

Filed Nov. 15, 1954 3 Sheets-Sheet 2

Inventors.
Willi Lohs, &
Walter Paul.
By. Atty.

Dec. 3, 1957 W. LOHS ET AL 2,815,402

IMPULSE STORAGE DEVICE FOR SIGNALING SYSTEMS

Filed Nov. 15, 1954 3 Sheets-Sheet 3

Inventors.
Willi Lohs, &
Walter Paul.
By [signature] Atty.

United States Patent Office 2,815,402

Patented Dec. 3, 1957

2,815,402

IMPULSE STORAGE DEVICE FOR SIGNALING SYSTEMS

Willi Lohs and Walter Paul, Munich, Germany, assignors to Siemens & Halske Aktiengesellschaft, Munich, Germany, a corporation of Germany Application November 15, 1954, Serial No. 468,952

Claims priority, application Germany November 16, 1953

13 Claims. (Cl. 179—16)

The present invention relates to an impulse storage device for signaling systems, for example, for telephone systems wherein the storage elements consist of resilient contact blades whose deflectable free ends are guided along the side faces of a guide ring.

Impulse storage devices are generally used as centrally located parts of automatic telephone systems. Their purpose is to store switching impulses, particularly those serving for line selection, and to transmit the stored pulses at a desired moment. Known arrangements serving this purpose either comprise complicated coupling devices, or, in order to avoid these, they include large inertia masses that require considerable kinetic energy for their movement.

In signal storage devices it is known to identify the beginning and the end of an impulse series by the position of predetermined blades on one or the side side of a guide ring, the blades being moved to such position through a recess in the periphery of the guide ring. These devices employ wiping or sliding elements for the sensing or scanning operation. Because of the resulting considerable wear, this does not permit the use of precious materials for the contacts.

The object of the present invention is to avoid the foregoing disadvantages by the provision of the following features:

The contact blades are combined in a stationary annulus; rotatably arranged concentrically to this blade annulus and within the range of action of the resilient free blade ends is the guide ring, which is provided with a recess for the passage of the blade ends; and the sensing or scanning operation is effected without any friction.

Two embodiments of the storage device according to the present invention are illustrated by way of example in the accompanying diagrammatic drawings, in which:

Fig. 1 shows, partly in longitudinal section a first embodiment employing mechanical sensing;

Fig. 1*a* shows parts of Fig. 1 in fragmentary end elevation;

Figure 1A:
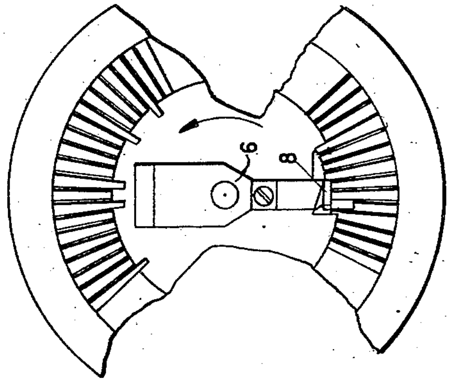
Figure 1:
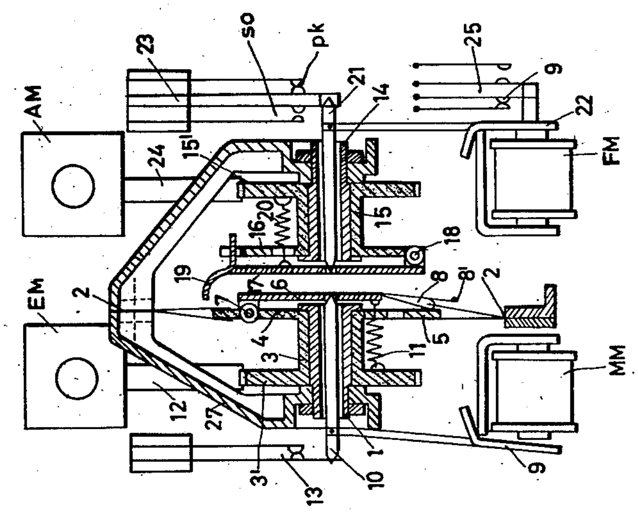

Referring to Fig. 1, a tubular shaft 1 supports a guide ring 4 whose hub is in the form of an elongated sleeve 3 so as to afford a sufficiently large bearing surface. The end of the sleeve 3 opposite to that forming the guide ring 4 is constructed as a ratchet wheel 3'. Rotation of the ring 4 about the shaft 1 is effected by means of a stepping magnet EM, acting through the pawl 12 upon the ratchet wheel 3'. Suitable shoulders on the shaft 1 and the housing 27 for the storage device secure the rotating members 3, 4 against axial displacement.

Stationarily mounted in the housing 27 is an annulus

2 having resilient contact blades radially inwardly extending therefrom and acting as storage elements. The annulus is arranged concentrically to the guide ring 4 in such a manner that the resilient free ends of the blades ride along the side faces of the guide ring. A marker arm 6 is eccentrically mounted on the guide ring 4 by means of a pivotal connection 7 and carries at its free end a blade guide 8 and a tab 8'. The marker arm 6 causes the storage blades to be selectively positioned on either side face of the guide ring 4 with the aid of a recess 5 formed in the periphery of the latter. The marker arm 6 is acted upon by a return spring 11. The control of the marker arm 6 is effected by means of a marking magnet MM through the armature 9 of the latter and a pin 10 displaceably guided within the tubular shaft 1. This pin is also adapted to actuate a contact set 13.

Mechanically separated from the above-described storage assembly is the sensing assembly. The latter, similarly to the storage assembly, includes a tubular shaft 14 supporting a sleeve 15 formed at opposite ends with a flange 16 and a ratchet wheel 15' respectively. A stepping magnet AM actuates the rotatable parts 15, 16 by means of a pawl 24 and the ratchet wheel 15'. The proper bearing arrangement is again insured by the adequate length of the sleeve 15 and by shoulders on the tubular shaft 14 and the housing 27. A sensing arm 17 having a finger 19 is eccentrically mounted on flange 16 by a pivotal connection 18 and is acted upon by a return spring 20. The control of the sensing arm 17 is effected by means of a sensing arm magnet FM through the intermediary of the armature 22 of this magnet and a pin 21 displaceably guided in the hollow shaft 14. This pin also actuates a contact set 23 while the armature 22 in addition actuates a contact set 25.

Both the sensing arm magnet FM and the marking magnet MM must be capable of overcoming the spring forces of the respective contact sets 23 and 13 acting upon the pins 21 and 10 respectively, when the armatures of these magnets are attracted.

Figure 2:
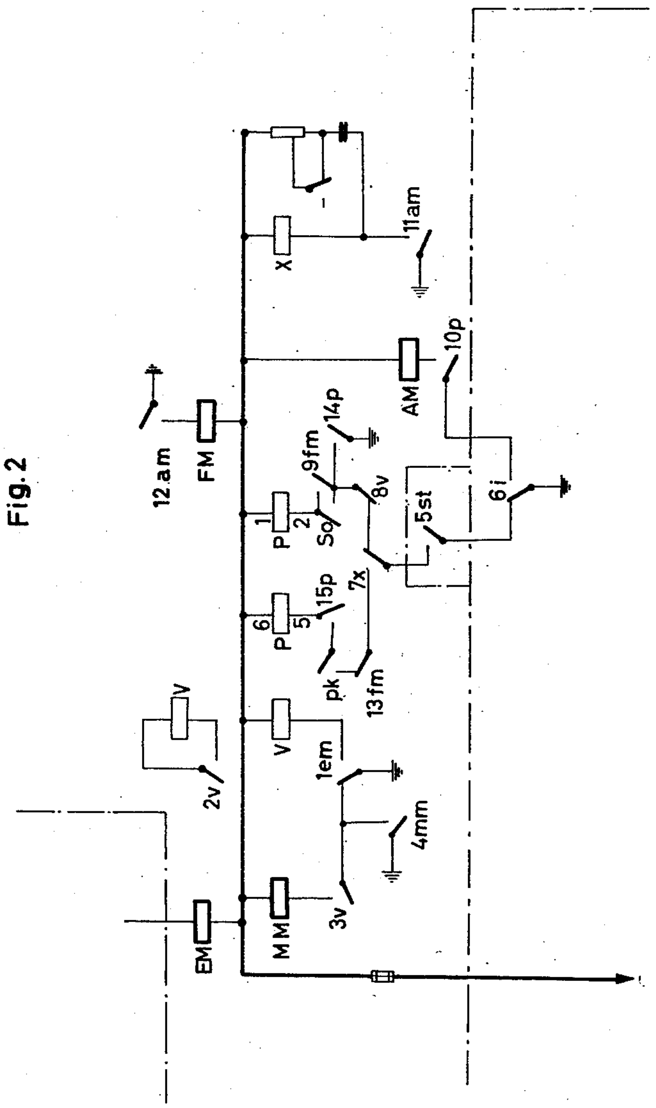
Fig. 2 is a circuit diagram showing the electrical connections involved in the embodiment of the storage device shown in Figs. 1 and 1*a*.
Figure 3A:
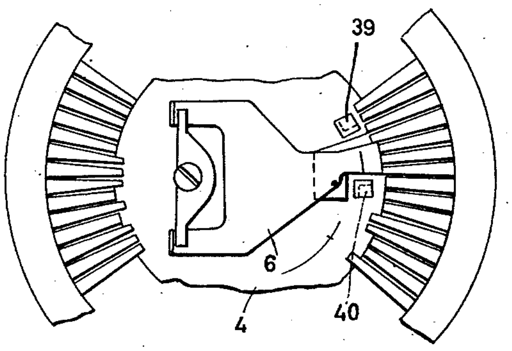
Fig. 3*a* shows parts of Fig. 3 in fragmentary end elevation.
Figure 3:
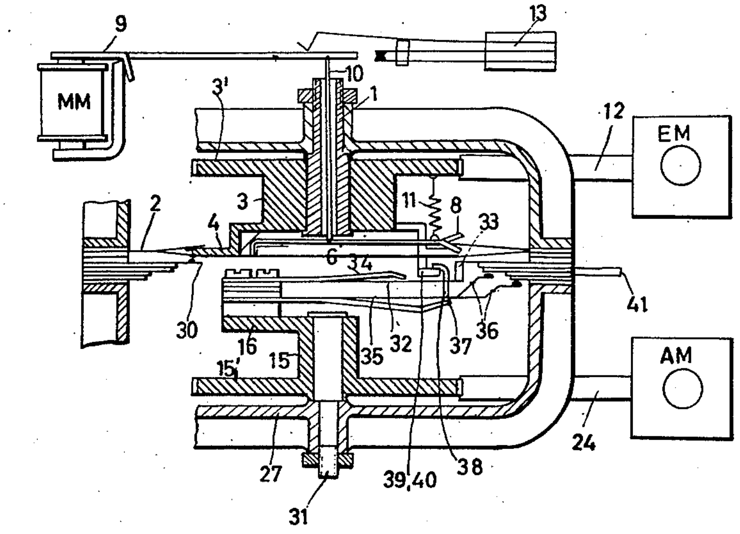
Fig. 3 illustrates a view, similar to Fig. 1, of a second embodiment of the storage device with electrical sensing.

Before describing the operation of the embodiment shown in Fig. 1 with reference to the circuit diagram of Fig. 2, the construction of the second embodiment, illustrated in Figs. 3 and 3*a* may be briefly described.

The embodiment of the impulse storage device illustrated in Figs. 3 and 3*a* operates with electrical sensing. The storage assembly of this device is similar to that of the embodiment shown in Figs. 1 and 1*a*. However, the guide ring 4 is additionally provided with hook-shaped cams 39 and 40. On the sensing assembly side of the device, the sleeve 15, formed with a flange 16 and a ratchet wheel 15', is mounted on a shaft 31. Suitable shoulders on this shaft 31 and on the housing 27 secure the sleeve against axial displacement. Eccentrically mounted on the flange 16 are a contact arm 35 with an abutment 37, and a sensing cam arm 32 with an abutment 34. The contact arm 35 carries a hook-shaped switch-actuating member 38 and two contact springs 36. The sensing cam arm 32 is provided with a switch-actuating cam 33. Insulatedly mounted on the housing 27, concentrically to the shaft 31, are two annular contact plates 41, located within the zone of action of the contact springs 36, and an annulus 30 having resilient contact blades extending radially inwardly into the zone of action of the cam 33.

The operation of the embodiment illustrated in Figs. 1 and 1*a* will now be described with reference to the circuit diagram of Fig. 2.

Upon the arrival of the first impulse of a pulse series, the electromagnet EM of the stepping mechanism is operated. Its contact 1*em* closes a circuit for a relay V extending from ground, 1*em*, relay V to battery. This relay V acts as a slow-to-release relay by reason of one of its windings being short-circuited at its contact 2$v$. The contact 3$v$ of this relay prepares the circuit for the marking magnet MM.

After the first impulse, the armature of stepping magnet EM releases, and the stepping pawl 12 rotates the ratchet wheel 3' and thus the guide ring 4 through one step. The marker arm 6 mounted on this ring also rotates, and the storage blade which happens to be positioned in the blade guide 8 at that moment, moves from this guide onto one side face of the guide ring 4 and thus occupies the marking position.

When the armature of the stepping magnet EM releases, the contact 1$em$ closes a circuit for the marking magnet MM, extending from ground over 1$em$, 3$v$ and MM to battery. The marking magnet MM operates and closes a holding circuit for itself which extends from ground, 4$mm$, 3$v$, MM to battery. The armature of this magnet, acting through pin 10, releases the marker arm 6 for movement by its return spring 11 so that the blade guide 8 will move through the recess 5 in the guide ring 4 to the opposite side face of the latter.

As long as the impulses keep arriving without any prolonged interruption, the relay V will not release, because of its delayed release action. The marking magnet MM remains energized through its holding circuit from ground, 4$mm$, 3$v$, MM to battery. The marker arm 6 deflects all blades emerging from the blade guide 8 onto the opposite side of the guide ring 4 and thus identifies them as unmarked blades.

At the end of an impulse series, the stepping magnet EM releases for a longer interval so that also relay V and hence the marking magnet MM are restored. The storage assembly then it in its normal (inoperative) position.

The next succeeding impulse series causes the same operation, with the first blade being directed to the marking side and the further blades being directed to the opposite side of guide ring 4. Thus, the number of unmarked blades between adjacent marked blades indicates the number of impulses in a series.

Sensing or scanning commences when a special starting signal is transmitted. This may take place either after switching through of the talking path, or—since the storage is adapted to store and scan simultaneously—after the storing of each digit or after each second or third digit, etc. Advantageously, the commencement of transmission is arranged to take place at a time when the storage assembly is not yet completely filled. This insures that the storage device is always ready to receive signals, since each blade automatically springs back to its starting position across the recess 5 after one revolution of the guide ring 4.

In the normal or zero relative position, that is, when no impulses have been stored, the finger 19 of the sensing arm 17 rests upon the tab 8' of the marker arm 6. At the beginning of a storing operation, when the marker arm 6 is stepped forward, the sensing arm finger 19 slides off the tab 8' and engages the first marked blade. While in the normal position the contact of contact series 23 (Fig. 1) was thus open and the contact $pk$ was closed, both of these contacts will now be closed. In the embodiment illustrated, the signal for starting the sensing operation is given by closure of contact 5$st$ (Fig. 2). This energizes a relay P through a circuit extending from ground, 6$i$, 5$st$, 7$x$, 8$v$, S$o$, P to battery. Contact 10$p$ prepares a circuit for the stepping magnet AM. Under the control of a central impulse relay (not shown), governing the contact 6$i$, the stepping magnet AM is energized through a circuit extending from ground, 6$i$, 10$p$, AM to battery and in turn operates a relay X through a circuit extending from ground, 11$am$, X to battery. The stepping magnet AM, acting through the stepping pawl 24 and ratchet wheel 15', causes the flange 16 and thus the sensing or scanning arm 17 to be advanced through one step for each release of its armature. Upon each attraction of the armature of the stepping magnet AM, a circuit extending from ground, 12$am$, FM to battery energizes the sensing or scanning arm magnet FM, and the armature 22 of the latter actuates the pin 21 to move the arm 17 away from the storage blades.

After the scanning system has been moved through one step by the stepping magnet AM, opening of the circuit of this magnet at contact 12$am$ releases the scanning arm magnet FM whereupon the scanning arm 17 is moved toward the storage blades by the action of the springs in the contact series 23. When the finger 19 of this arm 17 strikes an unmarked blade, the pin 21 causes the contact S$o$ of contact series 23 to be closed and contact $pk$ to be opened. Relay P remains energized, and further impulses from the central impulse relay control the scanning arm magnet FM and the stepping magnet AM in the scanning of the storage device.

When the scanning arm 17 strikes a marked blade, both contacts $pk$ and S$o$ are closed. Relay P then receives an opposing energization through a circuit extending from ground, 6$i$, 5$st$, 7$x$, 13$fm$, $pk$, 15$p$, P to battery and is thereby restored. Consequently, the stepping magnet AM is released, and with contact 11$am$ opening, relay X will be restored with some delay so as to interpose a corresponding delay interval. Release of this relay X causes reenergization of relay P. The transmission of impulses from the central impulse relay for controlling the stepping magnet AM and the scanning arm magnet FM and thus causing scanning of the storage device, continues until the scanning arm 17 again encounters a marked blade, whereupon the contact $pk$ initiates the interruption of the scanning operation in the manner already described.

When the sensing arm 17 has reached its normal or rest position relative to the storage and the scanning system, it engages the tab 8' of the marker arm 6. In this position, contact S$o$ is opened and contact $pk$ is closed. Relay P restores and stops any further scanning. This condition may arise when the marker arm 6 overtakes the sensing arm 17 (faulty dialing) or when the scanning arm 17 has caught up with the marker arm 6 (completion of the scanning operation).

Due to the alternating operation of the two electromagnets AM and FM, the scanning arm 17 is always positioned outside the range of action of the storage blades during the stepping of the scanning system and occupies the same position as when the assembly is in normal position. In order to avoid faulty controls, the armature 22 of the scanning arm magnet FM actuates contacts 9$fm$ and 13$fm$, one of which, 9$fm$, is connected in parallel with contact S$o$ while the other, 13$fm$, is connected in series with contact $pk$.

In the embodiment illustrated in Fig. 3, the storage system of the storage device according to the present invention is substantially identical with that of Fig. 1. However, while in the embodiment of Fig. 1, the scanning system operates on a mechanical basis, in the embodiment according to Fig. 3 the position of the storage blades is sensed by an electrical testing operation employing cam-controlled contact springs. This embodiment operates as follows:

When an impulse series is being received by the storage device, after the first impulse, the hook-shaped cam 40 for normal position will slide off the switch-actuating member 38 of contact arm 35. The contact springs 36 move off the contact plates 41 whereby a circuit including a normal-position relay (not shown) is opened. The impulses storage device is prepared for the scanning operation by changes in the normal-position contacts of the normal-position relay. The scanning operation itself, however, does not begin until a special starting impulse initiates it, whereupon scanning is controlled by a sequence of impulses from an impulse relay.

These impulses control the stepping or switching magnet

AM. When the armature of the latter releases, its pawl 24 steps the ratchet wheel 15' with the arms 32 and 35 in the direction of rotation of the storage device, that is, the scanning cam arm 32 trails the marker arm 6. The cam 33 successively deflects the blades 30 of the scanning blade annulus. The actuation of blades positioned opposite unmarked storage blades remains ineffective, as the contacts of the two blade groups do not come into engagement with each other. When, however, a blade is actuated that is positioned opposite a marked storage blade, a circuit is closed over the two blade disks 2 and 30. Relay P is oppositely energized and releases. This interrupts the scanning operation for a period of time defined by the delay in restoration of relay X. Upon release of relay X, the scanning continues. Upon the first actuation of stepping or switching magnet AM, relay X is operated over contact 11*am*, and the subsequent restoration of magnet AM causes the scanning cam arm 32 to advance through one step. The stepwise motion of the scanning cam arm 32 continues until the blades actuated by it encounter a marked storage blade again, whereupon the scanning is interrupted for the idle interval between two impulse series.

When normal or zero position is reached, the cam 40 provided for this position actuates contact arm 35, which bridges the blade disks 2 and 30 and establishes a circuit for the normal- or zero-position relay. The normal-position contacts stop the scanning operation until after new series of impulses have been stored, that is, until cam 40 has ridden off switch-operating member 38.

If during a number selection more impulses are entered for storage than the storage device can accommodate, the other cam 39 on the guide ring 4, acting as the cam for filled storage, likewise actuates the contact arm 35. Bridging of the blade disks 2 and 30 again energizes the zero or normal-position relay which operates simultaneously with a stepping relay in this phase condition only. A circuit including contacts of both of these relays causes deenergization of storage magnet EM and accelerated scanning through magnet AM in order to return the device to its normal position as quickly as possible after this faulty selection, so as to be ready for another selection. However, this expedient serves merely as a safeguard, since the appropriate control of the transmission start signal will insure that the storage will never be completely filled.

Changes may be made within the scope and spirit of the appended claims which define what is believed to be new and desired to have protected by Letters Patent.

We claim:

1. An impulse storage device for use in a signaling system comprising a stationary annulus having resilient contact blades radially inwardly extending therefrom, said contact blades constituting storage elements, a rotatable guide ring disposed concentric with said annulus for guide coaction with the free ends of said contact blades, a recess formed in said guide ring for permitting passage of said contact blades from one to the other side thereof, and means for scanning said storage elements substantially without frictional coaction therewith.

2. The structure defined in claim 1, comprising a marker arm rotatable with said guide ring, and guide means carried by said marker arm for selectively controlling the displacement of said contact blades through said recess from one to the other side of said guide ring.

3. The structure defined in claim 2, comprising link means for eccentrically pivotally mounting said marker arm on said guide ring, and a spring for biasing said marker arm in one direction of angular motion.

4. The structure defined in claim 3, comprising a hollow shaft for journalling said guide ring, an actuating pin extending axially through said shaft for controlling said marker arm, spring means for biasing said actuating pin in the direction of said marker arm, and an electromagnet for displacing said actuating pin against the pressure of said spring means to actuate said marker arm.

5. The structure defined in claim 1, comprising a bushing for journalling said guide ring, a ratchet carried by said bushing, and a stepping magnet for stepping said ratchet to rotate said guide ring.

6. The structure defined in claim 1, comprising a scanning arm for scanning said contact blades, and means for adjusting the position of said scanning arm relative to said contact blades out of engagement therewith.

7. The structure defined in claim 6, comprising a stationary shaft, a bushing rotatable on said shaft, a flange extending from said bushing, link means for pivotally eccentrically mounting said scanning arm on said flange, ratchet means on said bushing, and a stepping magnet for actuating said ratchet means to rotate said bushing for rotating said scanning arm.

8. The structure defined in claim 6, comprising a hollow shaft for rotatably journalling said scanning arm, a pin extending through said shaft, an electromagnet for displacing said pin axially of said hollow shaft to actuate said scanning arm, and contact means actuated by said pin.

9. The structure defined in claim 1, wherein said scanning means comprises a further stationary annulus having resilient contact blades extending therefrom, and rotatable cam means for controlling the actuation of said last named contact blades.

10. The structure defined in claim 9, comprising a bushinglike element forming a flange for supporting said cam means, ratchet means carried by said bushinglike element for rotating it and therewith said cam means, a contact arm carried by said bushinglike element, staggered contacts and a hook-shaped switching member carried by said contact arm, said staggered contacts coacting with said contact blades.

11. The structure defined in claim 9, comprising means for separately mounting said contact blade annuli.

12. The structure defined in claim 10, comprising means for defining the stroke of said contact arm and of said cam means, respectively.

13. An impulse storage device comprising a plurality of arcuately disposed radially inwardly directed resilient contact blades, a rotatably journalled guide ring having a recess formed peripherally thereof, the inner ends of said contact blades projecting toward said guide ring peripherally thereof, impulse responsive means for rotating said guide ring relative to said contact blades so as to dispose said blades selectively in alignment with said recess, blade guide means rotatable with said guide ring for moving contact blades aligned with said recess from one to the other side of said guide ring, an impulse responsive electromagnet and a circuit therefor controlled by said impulse responsive means for actuating said blade guide means, and a scanning device comprising a rotatable scanning arm, an electromagnet and circuit means for actuating it to rotate said scanning arm relative to but out of engagement with said contact blades, an electromagnet and circuit means therefor for actuating said scanning arm relative to said contact blades to determine the displaced position thereof relative to said guide ring, and circuit means controlled responsive to the actuation of said last named electromagnet for evaluating the determined position of said contact blades.

References Cited in the file of this patent

UNITED STATES PATENTS

| | | |
|---|---|---|
| 2,248,774 | Muller | July 8, 1941 |
| 2,301,822 | Shepherd | Nov. 10, 1942 |
| 2,303,918 | Dimond | Dec. 1, 1942 |
| 2,307,965 | Shepherd | Jan. 12, 1943 |
| 2,322,848 | Hibbard | June 29, 1943 |
| 2,445,829 | Henrikson et al. | July 27, 1948 |